US008420561B2

(12) United States Patent
Wang

(10) Patent No.: US 8,420,561 B2
(45) Date of Patent: *Apr. 16, 2013

(54) FLUE GAS SCRUBBING

(75) Inventor: Zhen Wang, Lake Zurich, IL (US)

(73) Assignee: Amcol International Corporation, Hoffman Estates, IL (US)

( * ) Notice: Subject to any disclaimer, the term of this patent is extended or adjusted under 35 U.S.C. 154(b) by 339 days.

This patent is subject to a terminal disclaimer.

(21) Appl. No.: 13/017,539

(22) Filed: Jan. 31, 2011

(65) Prior Publication Data

US 2011/0123422 A1    May 26, 2011

Related U.S. Application Data

(63) Continuation-in-part of application No. 12/485,561, filed on Jun. 16, 2009, now Pat. No. 8,268,744.

(51) Int. Cl.
*B01J 29/04* (2006.01)
*B01J 21/16* (2006.01)

(52) U.S. Cl.
USPC .................... 502/62; 502/80; 502/84

(58) Field of Classification Search .......... None
See application file for complete search history.

(56) References Cited

U.S. PATENT DOCUMENTS

| 3,807,702 | A | 4/1974 | Grillo et al. |
| 4,094,777 | A | 6/1978 | Sugier et al. |
| 4,361,493 | A | 11/1982 | Kiefer |
| 5,245,106 | A | 9/1993 | Cameron et al. |
| 5,248,641 | A | 9/1993 | Bauer et al. |
| 6,719,828 | B1 | 4/2004 | Lovell et al. |
| 7,048,781 | B1 | 5/2006 | Lovell |
| 7,288,499 | B1 | 10/2007 | Lovell et al. |
| 7,468,170 | B2 | 12/2008 | Comrie |
| 7,578,869 | B2 | 8/2009 | Yang et al. |
| 7,753,992 | B2 | 7/2010 | Yang et al. |
| 2002/0018853 | A1 | 2/2002 | Khare |
| 2003/0104937 | A1 | 6/2003 | Sinha |
| 2006/0210463 | A1 | 9/2006 | Comrie |
| 2007/0119300 | A1 | 5/2007 | Yang et al. |
| 2007/0122327 | A1 | 5/2007 | Yang et al. |
| 2007/0122619 | A1 | 5/2007 | Yang et al. |
| 2007/0140941 | A1 | 6/2007 | Comrie |
| 2007/0140943 | A1 | 6/2007 | Comrie |
| 2007/0289447 | A1 | 12/2007 | Yang et al. |
| 2007/0292328 | A1 | 12/2007 | Yang et al. |
| 2008/0121142 | A1 | 5/2008 | Comrie et al. |
| 2011/0123422 | A1 | 5/2011 | Wang |

FOREIGN PATENT DOCUMENTS

| EP | 0145539 | 6/1985 |
| EP | 0480603 | 4/1992 |
| WO | WO-2006006978 A1 | 1/2006 |
| WO | WO-2008064360 A2 | 5/2008 |
| WO | WO-2009017811 A2 | 2/2009 |
| WO | WO-2010147781 A1 | 12/2010 |

OTHER PUBLICATIONS

Bragg et al., "Crystal Structures of Minerals," *Cornell University Press* (1965).
Burba et al., "The Orientation and Interaction of Ethylenediamine Copper (II) with Montmorillonite," *Clays and Clay Minerals*, 25:113-118 (1977).
Ding et al., "Removal of Gas-Phase Elemental Mercury in Flue Gas by Inorganic Chemically Promoted Natural Mineral Sorbents," *Ind. Eng. Chem. Res.*, 51:3039-3047 (2012).
Ding et al., "Thermal study of copper adsorption on montmorillonites," *Thermochimica Acta*, 416:11-16 (2004).
El-Batouti et al., "Kinetics and thermodynamics studies of copper exchange on Na-montmorillonite clay mineral," *J. Colloid and Interface Sci.*, 259:223-227 (2003).
Ghorishi et al., "Development of a CI-Impregnated Activated Carbon for Entrained-Flow Capture of Elemental Mercury," *Environmental Sci. & Tech.*, 36:4454-4459 (2002).
Granite et al., "Novel Sorbents for Mercuery Removal from Flue Gas," *Ind. Eng. Chem. Res.*, 39:1020-1029 (2000).
Habashi et al., "The Reduction of Sulfide Minerals by Hydrogen in the Presence of Lime," *Metallurgical Transactions*, vol. 4 (Aug. 1973).
International Preliminary Report on Patentability for PCT/US2010/037580 dated Dec. 16, 2011.
International Search Report and Written Opinion for PCT/US2010/037580 mailed Aug. 11, 2010.
Katherine Dombrowski, *Effect of $SO_3$ on Hg Removal by Fly Ash and Activated Carbon*, available at <http://www.netl.doe.gov/publications/proceedings/06/mercury/panel/Dombrowski_Panel_121106.pdf> (Dec. 11, 2006).
Lee et al. "Novel sorbents for mercury emissions control from coal-fired power plants," *J. of the Chinese Inst. of Chem. Eng.*, 39:137-142 (2008).
Lee et al., "Bench-Scale Studies of In-Duct Mercury Capture Using Cupric Chloride-Impregnated Carbons," *Environ. Sci. Tech.*, 43:2957-2962 (2009).
Lee et al., "Development of Cost-Effective Noncarbon Sorbents for Hg0 Removal from Coal-fired Power Plants," *Environmental Sci. & Tech.*, 40:2714-2720 (2006).

(Continued)

*Primary Examiner* — Emily Le
*Assistant Examiner* — Michael Forrest
(74) *Attorney, Agent, or Firm* — Marshall, Gerstein & Borun LLP

(57) ABSTRACT

Herein is disclosed a flue gas scrubbing composition, a method of using the flue gas scrubbing composition, and a method of entombing mercury collected with the flue gas scrubbing composition. The flue gas scrubbing composition includes an admixture of a mercury sorbent material that comprises a clay, copper, and sulfur; and lime that comprises calcium oxide and/or calcium hydroxide. The method of collecting mercury from a flue gas includes injecting the flue gas scrubbing composition of any one of the preceding claims into a flue duct comprising the flue gas; reacting the mercury sorbent material with mercury in the flue gas to form a mercury-sorbed material and thereby reducing the concentration of mercury in the flue gas; reacting the lime with $SO_2$, $SO_3$, and/or HCl in the flue gas to form a calcium sulfate and/or a calcium chloride; and collecting a mixture that includes the mercury-sorbed material. The method of entombing mercury includes mixing the collected mixture of any one of claims 6 to 9 with water to form a freshly mixed concrete; and casting the freshly mixed concrete into a form.

18 Claims, 5 Drawing Sheets

OTHER PUBLICATIONS

Lee et al., "Modeling of Mercury Oxidation and adsorption by Cupric Chloride-Impregnated Carbon Sorbents," *Ind. Eng. Chem. Res.*, 48:9049-9053 (2009).

Liu et al., "Fuel Processing Technology," *J. Fuel Processing Tech.*, 91:1175-1197 (2010).

Mei et al., "Removal and recovery of gas-phase element mercury by metal oxide-loaded activated carbon," *J. of Hazaradous Materials*, 152:721-729 (2008).

Morency, "Zeolite Sorbent that Effectively Removes Mercury from Flue Gases," www.filtsep.com., feature article, Sep. 24, 2002.

Nol-Tec, "Dry Hydrated Lime Injection for Coal-Fired Boiler flue Gas Desulfurization (FGD)," (2009).

Pavlish et al., "Status review of mercury control options for coal-fired power plants," *Fuel Processing tech*. 82:89-165 (2003).

Plank et al., "Impact of zeta potential of early cement hydration phases on superplasticizer adsorption," *Science Direct*, 37:537-542 (2006).

Qu et al., "The role of iodine monochloride for the oxidation of elemental mercury, J. of Hazardous Materials," *J. of Hazardous Materials*, 183:132-137. (2010).

Smith, Cement and Concrete—Benefits and barriers in coal ash ustilisation, CCC/94—ISBN 92-9029-409-4 (Jan. 1, 2005).

Using Lime for Flue Gas Treatment, available at <http://www.lime.org/documents/publications/free_downloads/fgd-final-2000.pdf> (2000).

Vidic et al. "Vapor-phase elemental mercury adsorption by activated Carbon impregnated with chloride and chelating agents," 39:3-14 (2001).

Zhuang et al., "Investigations on bromine corrosion asociated with mercury control technologies in coal flue gas." *Fuel* 88:1692/1697 (2009).

International Search Report for PCT/US2011/046726 mailed Jan. 12, 2012.

Written Opinion for PCT/US2011/046726 mailed Jan. 12, 2012.

FLUE GAS SCRUBBING

PRIORITY

This disclosure is a Continuation-In-Part of U.S. patent application Ser. No. 12/485,561 filed Jun. 16, 2009, the disclosure of which is incorporated herein by reference in its entirety.

FIELD OF THE INVENTION

The present invention is directed to methods of using compositions for removing one or more environmental contaminant(s) (e.g., mercury or sulfur) from gas streams, e.g., industrial smoke stacks; flue ducts, and the like. The compositions, "flue gas scrubbing compositions", are particularly useful for removal of mercury from the flue gas emitted by coal-burning electrical power plants. The flue gas scrubbing composition comprises a mercury sorbent material and lime that can be disposed to contact the flue gas either sequentially or as an admixture. A product resulting from the reaction(s) of the environmental contaminants with the mercury removal media and/or lime can be used for, or sequestered in, concrete.

BACKGROUND AND PRIOR ART

Environmental contaminants contained in emissions from coal-fired and oil-fired power plants are a major environmental concern. Particulate matter (e.g., fly ash), nitrates, sulfates, and mercury emissions are restricted because these emissions can yield for example, acid rain and, serious neurotoxic effects. The removal of particulate matter has be addressed through, for example, the installation of baghouses, cyclone separators, or cyclone separators with baghouse filters in the flue gas ducts. The removal of nitrates and sulfates has be addressed through the addition of lime (calcium oxides and/or hydroxides) to the flue gas and the collection of the lime reaction product (e.g., $CaSO_4$) with the particulate matter. The removal of mercury can be addressed by absorption with a mercury absorbent material. Unfortunately, the mercury absorbent materials and lime are often chemically incompatible and/or the mercury absorbent material is fiscally incompatible with the collection and disposal of the particulate material which is often sold into the concrete industry.

The most common method for reduction of mercury emissions from coal-fired and oil-fired power plants is the injection of powdered, activated carbon into the flue gas stream. The activated carbon is a high surface area material that provides for the adsorption of the mercury and the agglomeration of the particle bound mercury. The disadvantage of adding activated carbon into the flue gas stream is the retention of the activated carbon in the fly ash waste stream. Fly ash from coal-fired power plants if often added to concrete, where the presence of the activated carbon adversely affects performance, thereby making the inclusion of the carbon fiscally incompatible with the flue gas scrubbing process.

Another method for reducing Hg emissions is through the addition of chemical species that react with mercury to chemadsorb the elemental Hg and oxidized Hg. One class of materials capable of chemically reacting with Hg are metal sulfides. U.S. Pat. No. 6,719,828 teaches the preparation of layered sorbents such as clays with metal sulfide between the clay layers. The method used to prepare the layered sorbents is based on an ion exchange process, which limits the selection of substrates to only those having high ion exchange capacity. In addition, the disclosed ion exchange is time-consuming, involving several wet process steps significantly impairing the reproducibility, performance, scalability, equipment requirements, and cost of the sorbent. The process of making a sorbent, in accordance with the teachings of U.S. Pat. No. 6,719,828, involves swelling a clay in an acidified solution, introducing a metal salt solution to exchange metal ions between the layers of the clay, filtering the ion exchanged clay, redispersing the clay in solution, sulfidating the clay by adding a sulfide solution, and finally filtering and drying the material. Another shortcoming of the process disclosed in U.S. Pat. No. 6,719,828 is the environmental liability of the by-products of the ion exchange process, i.e., the waste solutions of metal ions and the generated hydrogen sulfide.

U.S. Pat. No. 7,578,869 teaches the preparation of metal sulfide/bentonite clay composites for the removal of mercury from flue gas streams. The application teaches two methods, an "incipient wetness" process and a solid-state reactive grinding process, to prepare the composites. The processes are similar in that a copper salt is mixed with a bentonite clay and then a sulfide salt is added. The processes differ in the method of addition of the sulfide salt. In the first method the sulfide salt is added through an "incipient wetness" procedure where the sulfide salt is dissolved in water and added to the copper/clay mixture as an aqueous solution; in the second method the sulfide salt is added through a "solid-state reactive grinding" process where the sulfide salt hydrate is ground with the hydrated copper/clay mixture. The patent further teaches that the incipient wetness and solid-state grinding methods differ from the "wet" method of U.S. Pat. No. 6,719,828 because there is no ion-exchange of the copper ion for the exchangeable cationic ions of the bentonite clay.

The composite nature of the materials produced in the patent are supported by powder X-ray diffraction spectra that provide evidence of the formation of covellite (CuS), the same copper sulfide prepared in U.S. Pat. No. 6,719,828.

While U.S. Pat. No. 7,578,869 disclaims ion exchange, copper salts and bentonite clays readily and easily ion exchange to yield very stable copper/clay compositions. See e.g., Ding, Z. and R. L. Frost, "Thermal study of copper adsorption on montmorillonites." *Thermochimica Acta*, 2004, 416, 11-16. Analytical analysis of these compositions confirms both interlayer ion-exchange (intercalation) and edge adsorption of the copper salt. See e.g., El-Batouti et al., "Kinetics and thermodynamics studies of copper exchange on Na-montmorillonite clay mineral" *J. Colloid and Interface Sci.* 2003, 259, 223-227.

The disadvantage of these copper-based mercury absorbent materials is that these materials are known to react with lime, for example, yielding copper metal and calcium sulfide materials. See e.g., Habashi et al., *Metallurgical Transactions*, 1973, 4, 1865. These reaction products are unsuccessful in the absorption of mercury from the flue gas. Therefore, the use of the copper based mercury absorbent materials have been physically separated from the use of lime in the flue gas scrubbing process.

There is still an ongoing need to provide improved pollution control sorbents and methods of their manufacture and it is desirable to provide mercury sorbents that are compatible with lime.

SUMMARY

Herein is disclosed a flue gas scrubbing composition, a method of using the flue gas scrubbing composition, and a method of entombing mercury collected from the flue gas. The flue gas scrubbing composition includes an admixture of a mercury sorbent material that comprises a clay, copper, and sulfur; and lime that comprises calcium oxide and/or calcium hydroxide. The method of collecting mercury from a flue gas includes injecting the flue gas scrubbing composition into a flue duct or flue gas conduit; reacting the mercury sorbent material with mercury in the flue gas to form a mercury-sorbed material, thereby reducing the concentration of mercury in the flue gas; reacting the lime with $SO_2$, $SO_3$, and/or HCl in the flue gas to form calcium sulfate and/or calcium chloride; and collecting a byproduct mixture that includes the mercury-sorbed material. The method of entombing mercury includes mixing the collected mixture with water and optionally other concrete additives to form a freshly mixed concrete; and casting the freshly mixed concrete into a form.

DETAILED DESCRIPTION

Figure 1:
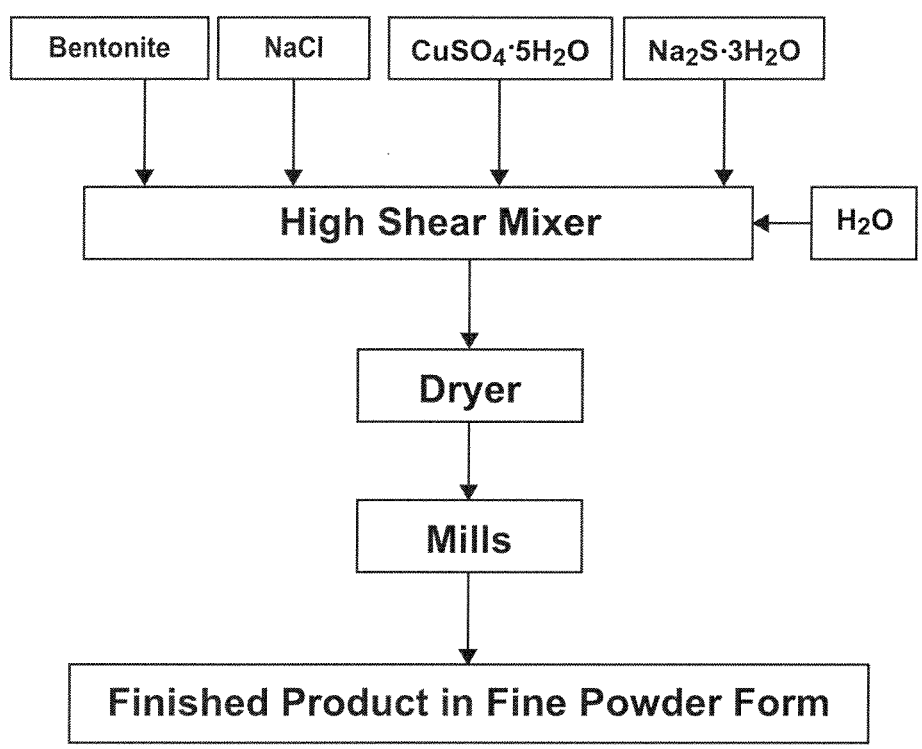
FIG. 1 is a process diagram for making mercury sorbent material by shear mixing.

Herein is disclosed a flue gas scrubbing method and composition that includes lime and a mercury sorbent material that maintains the majority of its activity (absorptivity) toward mercury in the presence of lime. Moreover, herein is disclosed a method of disposing of the reaction product(s) of the flue gas contaminants and the flue gas scrubbing composition (by product mixture) in concrete, which is a primary method of disposing of fly ash. Thereby, the composition, method and reaction products disclosed herein allow for the single step collection of particulate materials from a coal fired power plant; the sequestration of these particulate materials in concrete and concrete structures; and the manufacture of concrete structures.

As used herein, a flue gas scrubbing composition includes an admixture of a mercury sorbent material and lime. Preferably, the mercury sorbent material and the lime are synergistic. Herein, a synergistic interaction can be an increase in the mercury absorptivity in the presence of lime and/or an decrease in the $SO_3$ concentration in the flue gas in the presence of the mercury absorbent material (compared to the same conditions in the absence of lime or the mercury sorbent material). Preferably, the flue gas scrubbing composition has a mercury absorptivity that is greater than about 70% of the mercury absorptivity of the mercury sorbent material in the absence of lime. More preferably, the flue gas scrubbing composition has a mercury absorptivity that is greater than about 100%, even more preferably greater than about 103%, and still more preferably greater than about 105% of the mercury absorptivity of the mercury sorbent material in the absence of the lime. Furthermore, concentration of $SO_3$ in an filtrate (e.g., after a bag house filtration) or exhaust gas is lower when the lime is added in the presence of the mercury absorbent material.

As used herein, "lime" includes both the manufactured forms of lime and limestone; preferably, the lime used in the compositions and methods described herein is one or more of the manufactured forms of lime (e.g., quicklime and hydrated lime). Quicklime is the product of the calcination of limestone and consists of the oxides of calcium and magnesium. In the United States, there are three commercially available forms: high calcium quicklime (derived from limestone containing 0% to 5% magnesium carbonate); magnesian quicklime (derived from limestone containing 5% to 35% magnesium carbonate); and dolomitic quicklime (derived from limestone containing 35% to 46% magnesium carbonate). Hydrated lime is a dry powder manufactured by treating quicklime with sufficient water to satisfy its chemical affinity for water, thereby converting the oxides to hydroxides. Depending upon the type of quicklime used and the hydrating conditions employed, the amount of water in chemical combination varies, for example: high calcium hydrated lime contains generally 72% to 74% calcium oxide and 23% to 24% chemically combined water; dolomitic hydrated lime (normal) contains about 46% to 48% calcium oxide, 33% to 34% magnesium oxide, and 15% to 17% chemically combined water; dolomitic hydrated lime (pressure) contains about 40% to 42% calcium oxide, 29% to 30% magnesium oxide, and 25% to 27% chemically combined water.

In accordance with one aspect of the methods and materials disclosed herein, the mercury sorbent material includes a silicate clay material, copper and sulfur. Preferably, the Preferably, the mercury sorbent material is made from a silicate clay material, a reactive copper compound, and a reactive sulfur compound.

The silicate clay (phyllosilicate) can be a smectite clay, e.g., bentonite, montmorillonite, hectorite, beidellite, saponite, nontronite, volkonskoite, sauconite, stevensite, and/or a synthetic smectite derivative, particularly fluorohectorite and laponite; a mixed layered clay, particularly rectonite and their synthetic derivatives; vermiculite, illite, micaceous minerals, and their synthetic derivatives; layered hydrated crystalline polysilicates, particularly makatite, kanemite, octasilicate (illierite), magadiite and/or kenyaite; attapulgite, palygorskite, sepoilite; or any combination thereof. The clay material should have exchangeable cations. Preferably, the silicate clay material is a montmorillonite with predominantly exchangeable calcium and/or sodium ions (containing calcium and/or sodium exchangeable cations in a percentage greater than any other exchangeable cation).

The reactive copper compound is a copper-containing material that reacts with sulfur and/or sulfide ions. The reactive copper compounds provide a copper source for the methods and materials disclosed herein. The copper source is preferably a dry material. A dry copper source is herein defined as a reactive copper compound that is in a powdered, flake, or crystalline form that does not contain water in excess of any water(s)-of-hydration within the crystalline structure of the solid copper compound. Non-limiting examples of copper compounds that provide a copper source include the anhydrous and hydrous forms of copper acetate, copper acetylacetonate, copper bromide, copper carbonate, copper chloride, copper chromate, copper ethylhexanoate, copper formate, copper gluconate, copper hydroxide, copper iodide, copper molybdate, copper nitrate, copper oxide, copper perchlorate, copper pyrophosphate, copper selenide, copper sulfate, copper telluride, copper tetrafluoroborate, copper thiocyanate, copper triflate, copper metal, copper alloy, and mixtures thereof. Preferably, the copper source is a Cu(II) salt having a copper cation and a copper salt anion, more preferably the copper source is a Cu(II) salt where the pairing of the copper salt anion with a sodium ion is enthalpically preferable to the pairing with the copper cation, even more preferably the copper source is a Cu(II) salt where the pairing of the copper salt anion with a calcium cation is enthalpically preferable to the pairing with the copper cation, still more preferably the copper source is copper sulfate.

The reactive sulfur compound is a sulfur-containing material that reacts with copper and/or copper ions and provides a sulfur atom or polysulfide. The reactive sulfur compounds provide a sulfur source for the methods and materials disclosed herein. The sulfur source is preferably a dry material. A day sulfur source is defined herein as a reactive sulfur compound that is in a powdered, flake, crystalline, or gaseous form and does not contain water in excess of any water(s)-of-hydration within the crystalline structure of a solid sulfur source. Non-limiting examples of sulfur compounds that provide a sulfur source include the anhydrous and hydrous forms of sodium sulfide, sodium disulfide, sodium polysulfide, ammonium sulfide, ammonium disulfide, ammonium polysulfide, potassium sulfide, potassium disulfide, potassium polysulfide, calcium polysulfide, and mixtures thereof. Non-limiting examples of sulfur compounds that provide a sulfur source include the anhydrous forms of sulfur, hydrogen sulfide, hydrogen disulfide, aluminum sulfide, magnesium sulfide, thiolacetic acid, thiobenzoic acid, and mixtures thereof. Preferably, the sulfur source is a sulfide or polysulfide salt, more preferably the sulfide source is a sulfide salt, even more preferably, the sulfide source is a sodium sulfide, still more preferably the sulfide source is selected from $Na_2S$, $Na_2S \cdot 3H_2O$, and $Na_2S \cdot 9H_2O$, and even still more preferably the sulfide source is $Na_2S \cdot 3H_2O$.

Another important aspect of the methods and materials disclosed herein is an absence of a copper atom-sulfur atom chemical reaction prior to the shearing of the reactive compounds. One means for preventing copper+sulfur reactivity prior to the shearing of the compounds is by diluting the copper source and the sulfur source with the clay material. One of ordinary skill in the art would recognize that reaction rates are dependent on concentration and that the reaction of the copper source and the sulfide source would be similarly dependent. Moreover, the reaction of the copper source and the sulfide source is inhibited by the absence of free water. The addition of water and the possible formation of copper solutions and/or sulfide solutions would greatly enhance the reaction rates between the copper source and the sulfide source. Herein, any solid state reaction would be dependent on the mobility of the ions and the exposed surface area of the copper source and sulfide source, and therefore this solid state reaction would be very slow.

Preferably, the copper source is mixed with the clay material prior to the addition of this copper/clay mixture to a mechanical shearing apparatus, as described below. Similarly, the sulfur source is preferably mixed with the clay material prior to the addition of this sulfur/clay mixture to a mechanical shearing apparatus. Optionally, the copper/clay mixture and the sulfur/clay mixture can be admixed to form a mercury sorbent pre-mixture prior to the addition of the mercury sorbent pre-mixture to a mechanical shearing apparatus. Yet another method of providing the materials to a mechanical shearing apparatus is by admixing the clay material with the copper source and the sulfur source (optionally, first adding the copper source to the clay materials, then adding the sulfur source of the mercury sorbent pre-mixture or any variation in order thereof). One of ordinary skill would appreciate that the order of addition would vary dependent on the specific (reactive compound) sources. Alternatively, the copper/clay and sulfur/clay mixtures can be added independently to a mechanical shearing apparatus. The addition of single or multiple dry materials to a mechanical shearing apparatus can be by any means available to one of ordinary skill in the art.

In one embodiment, the copper/clay mixture and the sulfur/clay mixture are produced and admixed in a single process wherein the copper source and the sulfur source are added to the clay material. The mixture is then stirred to distribute the copper source and the sulfur source homogeneously throughout the clay material with a non-shearing mixer to form a mercury sorbent pre-mixture. An example of a non-shearing mixer is a paddle-type mixer.

The masses of added copper source to added sulfide source are adjusted to provide the preferred molar ratios of copper ion and sulfide ion, that are understood to be a measure of the copper atoms and sulfur atoms. For example, when the sulfide source is a polysulfide, the copper ion to sulfide ion ratio represents the molar ratio of copper atoms (ions) to sulfur atoms, the latter having a formula of $S_x^{2-}$ where x is greater than 1. The ratio of copper ion to sulfide ion is in the range of about 0.1 to about 10. Preferably, the ratio (Cu:S) is about 0.1, 0.2, 0.3, 0.4, 0.5, 0.7, 0.9, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. When the sulfide source is a polysulfide the ratio is generally less than 1. In one preferable embodiment the copper ion to sulfur ion ratio is less than about 1, more preferably less than about 0.5; in another preferable embodiment the ratio is greater than about 1, more preferably greater than about 2.

The copper source is added to the clay material in a weight ratio approximately consistent with the clay's cationic exchange capacity. The cationic exchange capacity is a measure of the molar equivalents of exchangeable clay cations (determined based on a monovalent exchangeable cation) per 100 g of clay (e.g., montmorillonite clays can have cationic exchange capacities in a range of about 70 to about 100 milliequivalents (meq) per 100 g). Preferably, the addition of the copper source to the clay material is such that about 10 to about 300 meq of copper cation are added to about 100 g clay, more preferably about 20 to about 200 meq Cu to about 100 g clay, still more preferably about 50 to about 150 meq Cu to about 100 g clay.

Still another important aspect of the materials and methods presented herein is the shearing of the mercury sorbent pre-mixture. Mechanical shearing methods may employ extruders, injection molding machines, Banbury® type mixers, Brabender® type mixers, pin-mixers, and the like. Shearing also can be achieved by introducing a copper/clay mixture and a sulfur/clay mixture at one end of an extruder (single or double screw) and receiving the sheared material at the other end of the extruder. The temperature of the materials entering the extruder, the temperature of the extruder, the concentration of materials added to the extruder, the amount of water added to the extruder, the length of the extruder, residence time of the materials in the extruder, and the design of the extruder (single screw, twin screw, number of flights per unit length, channel depth, flight clearance, mixing zone, etc.) are several variables which control the amount of shear applied to the materials.

Preferably, water is added to the mechanical shearing unit to facilitate the shearing of the mercury sorbent pre-mixture as well as the reactions of the copper with the clay (ion exchange), and the copper with the sulfur. Due to the variability in the design of most mechanical shearing units, e.g.

the feed capacity, the amount of water added to the unit is preferably defined by the weight percentage of water in the sheared material. Preferably, the mercury sorbent material, after exiting the mechanical shearing unit, comprises about 15 wt. % to about 40 wt. % water, more preferably about 20 wt. % to about 30 wt. % water, even more preferably about 23 wt. % to about 28 wt. % water.

Figure 2:
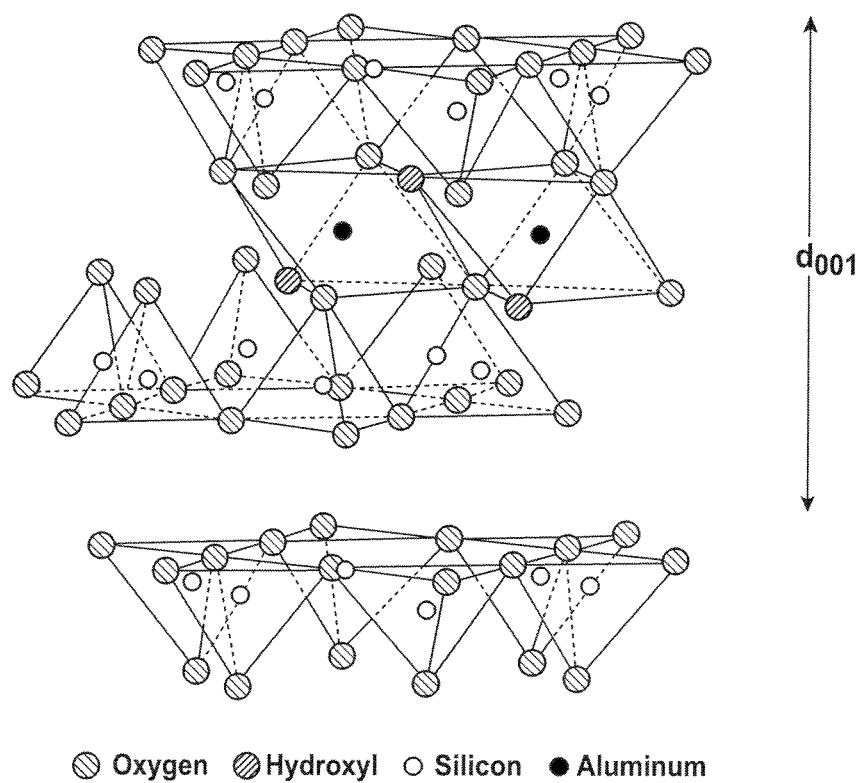
FIG. 2 is a drawing of a montmorillonite structure indicating the d(001)-spacing as can be determined by powder X-ray diffraction.
Figure 3:
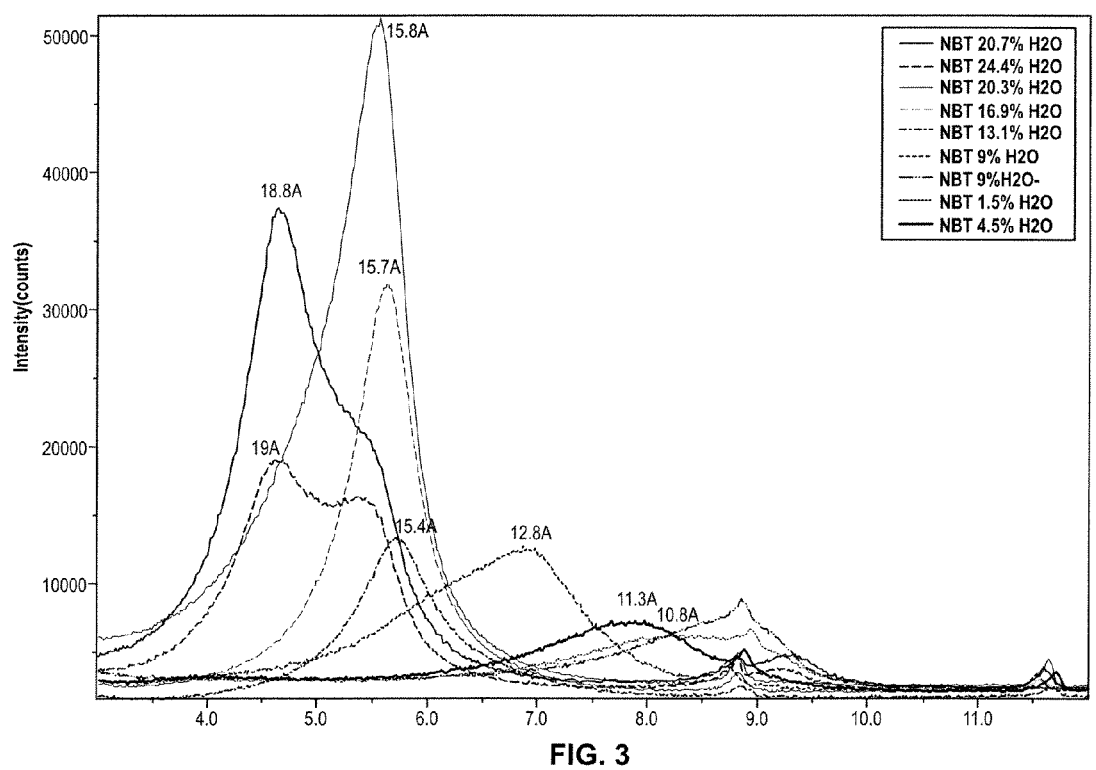
FIG. 3 is a composite drawing of powder X-ray diffraction patterns for sodium montmorillonite. The lines represent the low-angle diffraction patterns for the sodium montmorillonite containing from about 0.9 wt. % to about 24.4 wt. % water.
Figure 4:
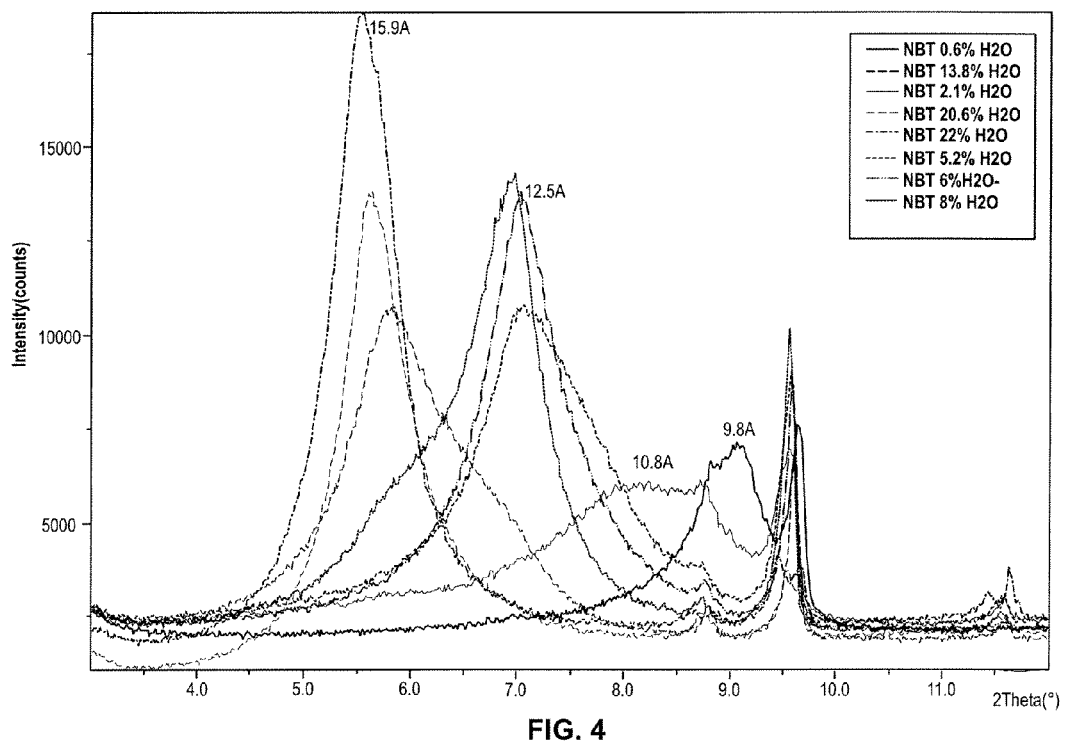
FIG. 4 is a composite drawing of powder X-ray diffraction patterns for a herein described mercury sorbent material. The lines represent the low-angle diffraction patterns for the material containing from about 0.6 wt. % to about 22 wt. % water.

One method for determining the structure and composition of the materials disclosed herein is through powder X-ray diffraction (powder XRD). The powder XRD patterns of clay materials are characterized by a broad, low angle peak corresponding to the inter-silicate-layer spacing. See FIG. 2. Often used to determine the moisture content of water swellable clays, the angle where the peak maximum of this low angle peak decreases with increasing inter-layer spacing, see FIG. 3, wherein the peak maximum decreases with increasing water adsorbed into the inter-layer space. For example, a diffraction angle of about 7° two theta (2Θ) in a sodium montmorillonite clay corresponds to an interlayer d(001) spacing of about 12 Å and an angle of about 9° 2Θ corresponds to an interlayer d(001) spacing of about 9 Å, close to the thickness of the clay platelet. Changes to the interlayer d(001) spacing for montmorillonite clays and clay samples with added copper ion was thoroughly investigated by Burba and McAtee in "The Orientation and Interaction of Ethylenediamine Copper (II) with Montmorillonite" *Clays and Clay Minerals,* 1977, 25, 113-118. Therein, the intercalation and multi-platelet binding of copper ions was reported and an average interlayer d(001) spacing for Cu(II) montmorillonite samples was about 12.5 Å. The layered copper-sulfide//silicate//copper-sulfide materials disclosed in U.S. Pat. No. 6,719,828 would have a interlayer d(001) spacing significantly greater than 12.5 Å due to the added thickness of the copper-sulfide layers. The surface deposited copper sulfide materials disclosed in U.S. patent application Ser. No. 11/291,091 would exhibit the same interlayer d(001) spacing as the original montmorillonite (e.g., FIG. 3) because, as taught, the copper-sulfide, therein, deposits only on the surface of the clay. Herein, the methods and materials were found to have interlayer d(001) spacings less then about 12 Å when the moisture content of the materials was less than 4 wt. %. See e.g., FIG. 4, indicating that the materials and methods described herein do not conform to the structures taught in the prior art.

Figure 5:
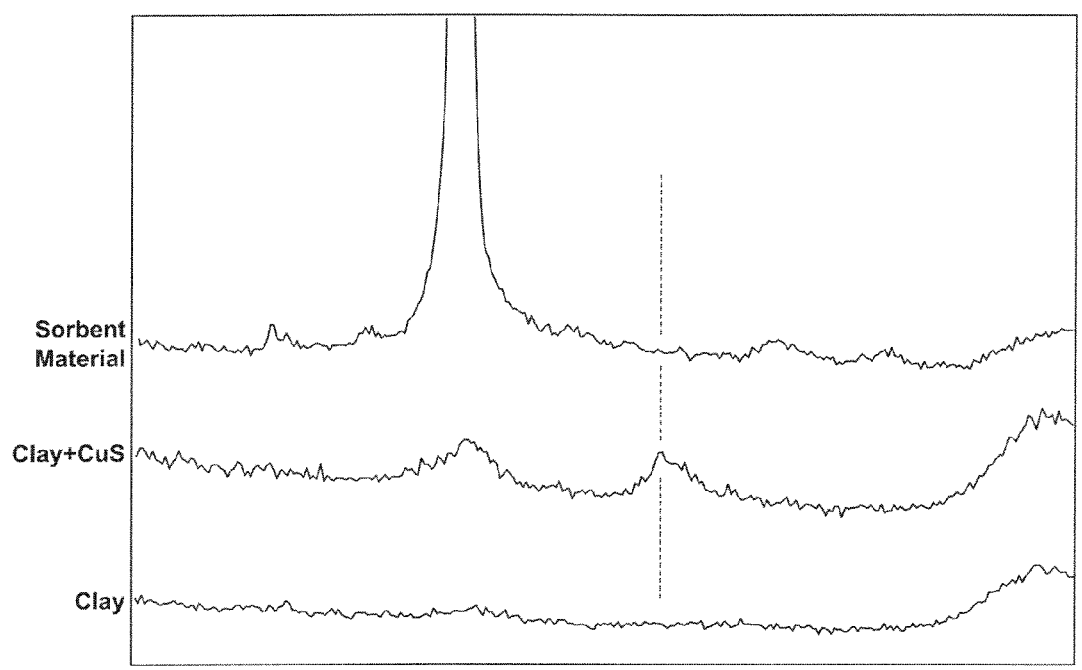
FIG. 5 is a composite drawing of the powder X-ray diffraction patterns between about 30 and 35 2·Θ for samples of a sodium montmorillonite, a sodium montmorillonite containing about 4.5 wt. % covellite, and the herein described mercury sorbent material containing the equivalent of 4.5 wt. % copper sulfide.

Moreover, the mercury sorbent materials disclosed herein are substantially free of covellite, the copper sulfide mineral disclosed in U.S. patent application Ser. No. 11/291,091. Covellite is the kinetic product of copper(II) ions with sulfide ($S^{2-}$) ions and has a formula of CuS. The powder XRD pattern of covellite contains at least four signature reflections; three of these reflections overlap with reflections in montmorillonite clay materials. The reflection at 2.73±0.01 Å (where the variability in the location of the reflection is dependent in part on the accuracy of the diffractometer) is characteristic of the covellite material and is observable in clay predominating samples. FIG. 5 shows three powder XRD patters in the 30° to 35° 2·Θ range. The XRD pattern for copper sulfide free clay is shown on the bottom; the XRD pattern for clay containing 4.5 wt. % covellite is shown in the middle; the XRD patter for a herein disclosed clay material containing the equivalent of 4.5 wt. % copper sulfide is shown on the top. The covellite reflection at 2.73 Å was marked with a vertical dashed line. As is clearly indicated by the powder XRD pattern the herein disclosed material is substantively free of the diffraction peak at 2.73±0.01 Å.

Yet another important aspect of the materials and methods disclosed herein are zeta (ζ)-potential values for the mercury sorbent materials being higher (less negative) then the ζ-potential values for the clay materials used to manufacture the mercury sorbent materials. The surface charge on a microparticulate, e.g., a clay, can often be determined by a measurement of the ζ-potentia) and/or electrophoretic mobility. The structures of the clays applicable herein are composed in part of silicon-oxygen (silicate) arrangements as described by Bragg et. al. in *Crystal Structures of Minerals*, pp. 166-382 (Cornell University Press 1965), and incorporated herein for the structures and formulas of silicate materials. The silicate portion of a clay often has an anionic charge that is balanced in the material by the inclusion of Alkali Metal and/or Alkali Earth cations. The suspension of these materials and measurement of their ζ-potential provides a means for assessing the ion paring (cations to silicate) in the clay material. The lower (more negative) the ζ-potential the greater the percentage of weak ionic interactions between the cations and the silicate. Higher (less negative) ζ-potentials indicate stronger ionic interactions or covalent interactions between the cations and the silicate. The blending of neutral materials with the clay material would not be expected to change the ζ-potential of the clay material. Ion exchange of the Alkali Metal and/or Alkali Earth cations of the clay material would be expected to change the ζ-potential if the exchanged for ion has a different binding energy with the silicate.

Still another important aspect of the materials and methods disclosed herein is a material particle diameter that can be trapped by particulate collectors in coal-fired electrical power plants. Preferably, average particle diameters are greater than 0.1 μm, still more preferably greater than 1 μm. The preferred average particle diameter of the mercury sorbent materials described herein, for the sorption of mercury in flue gases, is dependent on the particulate collectors at the individual power plants. Examples of particulate collectors include baghouse fabric filters, electrostatic precipitators, and cyclone collectors. Generally and well known in the art, larger particles are easier to remove from flue gasses. Preferably, the majority of particles have a diameter in the range of about 1 to about 100 μm, more preferably in the range of about 1 to about 50 μm, most preferably about 10 to about 25 microns.

The process for using the herein disclosed flue gas scrubbing compositions includes injecting the flue gas scrubbing composition into a flue duct comprising the flue gas; reacting the mercury sorbent material with mercury in the flue gas, by contact, to form a mercury-sorbed material and thereby reducing the concentration of mercury in the flue gas; reacting the lime with $SO_2$, $SO_3$, and/or HCl in the flue gas to form a calcium sulfate and/or a calcium chloride; and collecting a byproduct mixture that includes the mercury-sorbed material, optionally the calcium sulfate and/or calcium chloride, and optionally unreacted mercury absorbent material and/or lime. Optionally, the method can include separately injecting the mercury sorbent material into the flue duct while injecting the lime into the flue duct at a location where the lime and the mercury sorbent material admix in the flue duct thereby forming the herein disclosed flue gas scrubbing composition. Alternatively, the mercury sorbent material and lime can be injected as an admixture into the flue duct.

The mercury sorbent material can be added to the flue gas to provide an injection concentration, typically, less than about 30 lbs/MMacf (pounds per one million actual cubic feet of flue gas). In one embodiment, the injection concentration is in a range of about 0.1 to about 20 lbs/MMacf, or in a range of about 0.5 to about 15 lbs/MMacf, or in a range of about 1 to about 10 lbs/MMacf. The injection concentration for each individual boiler can be determined from, for example, the type of fuel used, the mercury content in the fuel, the mercury content in the flue gas, and/or the environmental regulations and permits for the boiler or boiler operator. As the mercury concentration in the fuel can change during the life of the boiler, the injection concentration can vary based on that mercury concentration. Likewise the injection concentration can change based on any of the factors that can be used to determine the injection concentration. The injection concentration can be less than about 50 lbs/MMacf, less than about 40 lbs/MMacf, less than about 30 lbs/MMacf, less than about 20 lbs/MMacf, less than about 15 lbs/MMacf, less than about 10 lbs/MMacf, or less than about 5 lbs/MMacf.

The process can include either dry scrubbing or wet scrubbing the flue gas with the lime. In dry scrubbing, lime is injected directly into flue gas to remove $SO_2$ and HCl. There are two major dry processes: "dry injection" systems inject dry hydrated lime into the flue gas duct and "spray dryers" inject an atomized lime slurry into a separate vessel.

The injection rate of the lime into the flue duct (and thereby into the flue gas) is, typically, less than about 10,000 lbs/hr. In one embodiment, the injection rate is in a range of about 1 to about 5,000 lbs/hr, or about 2 to about 1,000 lbs/hr, or about 5 to about 500 lbs/hr. The injection rate of the lime into each individual flue duct can be determined from, for example, the type of fuel used, the contaminant content in the fuel, the contaminant content in the flue gas, and/or the environmental regulations and permits for the boiler or boiler operator. As the contaminant concentration in the fuel and/or flue gas can change during the life of the boiler, the injection rate can vary based on that concentration (e.g., switching from high sulfur coal to low sulfur coal). Likewise the injection rate can change based on any of the factors that can be used to determine the injection concentration. The injection rate can be less than about 10,000; 9,000; 8,000; 7,000; 6,000; 5,000; 4,000; 3,000; 2,000; 1,000; 750, 500, or 250 lbs/hr.

The mercury sorbent material and the lime can be admixed prior to injection into the flue duct, admixed concurrent with injection into the flue duct, or can mix within the flue duct. A flue gas scrubbing composition that consists essentially of the mercury sorbent material and the lime can be manufactured by admixing the two components. The amounts of the mercury sorbent material and lime in the flue gas scrubbing composition are determined by the desired and/or predetermined injection concentration of the mercury sorbent material and injection rate of lime.

A spray dryer is typically shaped like a silo, with a cylindrical top and a cone bottom. Hot flue gas flows into the top. Lime slurry is sprayed through an atomizer (e.g., nozzles) into the cylinder near the top, where it absorbs $SO_2$ and HCl. The water in the lime slurry is then evaporated by the hot gas. The scrubbed flue gas flows from the bottom of the cylindrical section through a horizontal duct. A portion of the dried, unreacted lime and its reaction products fall to the bottom of the cone and are removed. The flue gas then flows to a particulate control device (e.g., a baghouse) to remove the remainder of the lime and reaction products.

Both dry injection and spray dryers yield a dry final product, collected in particulate control devices. At electric generating plants, dry scrubbing is used primarily for low-sulfur fuels. At municipal waste-to-energy plants, dry scrubbing is used for removal of $SO_2$ and HCl. Dry scrubbing is used at other industrial facilities for HCl control. Dry scrubbing methods have improved significantly in recent years, resulting in excellent removal efficiencies.

In wet lime scrubbing, lime is added to water and the resulting slurry is sprayed into a flue gas scrubber. In a typical system, the gas to be cleaned enters the bottom of a cylinder-like tower and flows upward through a shower of lime slurry. The sulfur dioxide is absorbed into the spray and then precipitated as wet calcium sulfite. Wet scrubbing treats high-sulfur fuels and some low-sulfur fuels where high-efficiency sulfur dioxide removal is required. Wet scrubbing primarily uses magnesium-enhanced lime (containing 3-8% magnesium oxide) because it provides high alkalinity to increase $SO_2$ removal capacity and reduce scaling potential.

The collected byproduct mixture can include the mercury-sorbed material and a material selected from the group consisting of unreacted mercury sorbent material, unreacted lime, fly ash, and a mixture thereof. Preferably, the collected byproduct mixture includes the mercury-sorbed material the products of the reaction of the lime with the flue gas (e.g., calcium sulfate/sulfite) and fly ash.

The collected byproduct mixture is preferably used to form concrete. For example, the collected byproduct mixture can be mixed with water to from a freshly mixed concrete. Preferably, the collected byproduct mixture is mixed with, for example, Portland cement and with water to for freshly mixed concrete. The freshly mixed concrete can then be cured to form a hardened concrete. As the collected byproduct mixture can include the mercury-sorbed material and at least one material selected from the group consisting of an unreacted mercury sorbent material, unreacted lime, calcium sulfate, calcium chloride, fly ash, and a mixture thereof, the concrete can include these materials.

An important aspect of the materials and methods described herein, especially when used in the process of making concrete, is the irreversible binding of mercury from the flue gas stream to the mercury sorbent materials described herein. Herein, irreversible binding means that the sequestered mercury is not leached from the mercury sorbent material by water or solvents that are primarily water.

While activated carbon containing fly ash can be detrimental to concrete formation and stability, the herein flue gas scrubbing composition and the mercury-sorbed material are preferably not detrimental to the formation and/or stability of concrete. Preferably, the mercury sorbent material does not increase the amount of an air-entrainment agent (AEA) necessary for the formation of concrete, one measure of which is a Foam Index test value. More preferably, the mercury sorbent material does not adsorb or reaction with the AEA, even more preferably the mercury sorbent materials aids the AEA in forming stable 10 to 250 pm pockets within the finished concrete. Moreover, the sorbed (sequestered) mercury preferably does not leach from the mercury sorbent material during or after the concrete formation process. Additionally, the inclusion of the mercury sorbent material preferably inhibits the degradation of concrete. Methods of inhibiting degradation of concrete include limiting and/or preventing the alkali silicate reaction, carbonation, sulfate attack, leaching, and/or structural damage from freeze/thaw cycling. Without being bound to any particular theory, the herein described materials preferably inhibit the degradation of concrete though water adsorption and limited expansion thereby improving the freeze/thaw cycling of the concrete and/or through prevention of ion leaching. An additional benefit of the herein described materials is the similarity in bulk structure to cement, silicate-aluminate materials, preferably supporting chemical binding of the mercury sorbent material into prepared concrete.

Mercury sorbents can be tested and evaluated for their performance under different conditions:

A laboratory bench scale test uses nitrogen, air or simulated flue gas, and typically the sorbent is placed in a fixed bed. The simulated flue gas has a composition of $SO_2$, $NO_x$, HCl, $CO_2$, $O_2$, $H_2O$ and $Hg^0$ under an elevated temperature.

The gas is passed through the sorbent bed at a certain flow rate. The effluent gas is analyzed for its mercury concentration by a mercury analyzer. The test is allowed to proceed until adsorption equilibrium has been reached. Both the mercury removal efficacy and sorption capacity can be concluded at the end of the test. The factors having influence on the results are temperature, oxidation state of mercury and composition of the flue gas. The bench scale test is a very economic way to screen sorbents.

A pilot scale test is very effective to study sorbent performance under conditions close to the true industrial conditions. The test unit is normally set-up for an in-flight test. The simulated flue gas, or a slip stream flue gas can be extracted from an industrial facility, such as a power plant's ESP (electrostatic precipitator) or a fabric filter unit can be used to house the sorbent. The sorbent is injected into the test system and the mercury concentration is monitored for the mercury concentration change. The contact time between sorbent and flue gas need be only a few seconds.

Lastly, a full scale power plant test can be arranged. The design and selection of injection systems and rapid and accurate measurement of mercury concentration are important factors during the evaluation period.

EXAMPLES

The following examples are provided to illustrate the invention, but are not intended to limit the scope thereof.

Example 1

In the bowl of a KITCHENAID stand mixer, 368.5 g sodium bentonite (85% passing 325 mesh), 16.5 g sodium chloride (United Salt Corporation, passing 20 mesh), 57.0 g copper sulfate pentahydrate (Old Bridge Chemicals, Inc. passing 40 mesh), and 31.0 g sodium sulfide trihydrate (Chem One Ltd.) were admixed for 5 minutes. Then 74.0 g de-ionized water was added to the mixture and the mixture was stirred 5 minutes. The mercury sorbent mixture was then extruded three times using a laboratory-scale extruder with a die-plate. The extrudates were then oven-dried at 100° C. The dried extrudates were ground and resulting particles passing through a 325 mesh screen were collected. The final moisture content of this sample was approximately 2 wt. %.

Example 2

In the bowl of a KITCHENAID stand mixer, 232.0 g sodium bentonite, 26.4 g sodium chloride, 91.2 g copper sulfate pentahydrate, and 49.6 g sodium sulfide trihydrate were admixed for 5 minutes. Then 52.4 g de-ionized water was added to the mixture and the mixture was stirred 5 minutes. The mercury sorbent mixture was then extruded three times using a laboratory-scale extruder with a die-plate. The extrudates were then oven-dried at 70° C. The dried extrudates were ground and resulting particles passing through a 325 mesh screen were collected. The final moisture content of this sample was approximately 3.5 wt. %.

Example 3

A mercury sorbent mixture was prepared by admixing 2,060 lbs sodium bentonite, 92.2 lbs sodium chloride, 318.6 lbs copper sulfate pentahydrate, 173.3 lbs sodium sulfide trihydrate in the bowl of a paddle mixer. The mixture was combined for 20 minutes and then fed into a 5 inch READCO continuous processor (by Readco Manufacturing Inc.) at a feed rate of about 900 lb/hr. As the mercury sorbent mixture was fed into the processor, water was fed into the processor through a liquid injunction port (separate from the dry-mixture feed port) at about 0.35 gallon/minute. The extrudate was dried at about 100° C. and ground to reduce the particle size. The mercury sorbent materials was found to have an average particle size of about 5 to about 25 µm and a moisture content below 10 wt. %.

Example 4

A mercury sorbent mixture was prepared by admixing 700 lbs sodium bentonite, 31.3 lbs sodium chloride, 108.3 lbs copper sulfate pentahydrate, and 59.0 lbs sodium sulfide trihydrate in the bowl of a paddle mixer. The mixture was combined for 20 minutes and then fed into a 16" pin mixer (Mars Mineral) at a feed rate of about 1,100 lb/hr. As the mercury sorbent mixture was fed into the pin mixer, water was fed into the processor through a liquid injunction port (separate from the dry-mixture feed port) at about 0.35 gallon/minute. The extrudate was dried at about 100° C. and ground to reduce the particle size. The mercury sorbent materials was found to have an average particle size of about 5 to about 25 µm and a moisture content below 10 wt. %.

Pilot Scale Testing

Pilot scale injections were conducted on a 5 MW slip stream power system that includes coal-fired boilers, air pre-heaters, fabric filters (bag house), electrostatic precipitators (ESP), dry sorbent injection systems, wet scrubber, and gas injection systems. The designed flue gas flow rate is 50,500 lb/hr (23,900 acf/min at 700° F.; 18,035 acf/min at 300° F.). All sorbents (mercury absorbent material, lime) were injected prior to the bag house. During testing the flue gas flow rates varied from 17,700 acf/min to 19,400 acf/min at 400° F.

For all trials, the percent mercury removal was calculated from the difference in mercury concentration in the boiler effluent and bag house filtrate (flue gas after the collection of particulate materials in a fabric filter). The $SO_3$ concentrations were determined for the filtrate. Across all runs, the concentrations of mercury and $SO_3$ in the boiler effluent was constant. Pilot scale testing was completed with a mercury sorbent (mercury absorbent material) manufactured by the method of Example 3, above.

Trial 1

For trial examples T1-T5, the injection concentration of the mercury absorbent material was varied and no lime was injected.

| | Mercury Sorbent Injection Concentration (lb/MMacf) | Lime Injection Rate (lb/hr) | % Mercury Removal | $SO_3$ Concentration in Effluent (PPMV) |
|---|---|---|---|---|
| T1 | 1.1 | 0 | 12 | 1.6 |
| T2 | 2.4 | 0 | 27 | 1.7 |
| T3 | 3.5 | 0 | 61 | 1.6 |
| T4 | 5.5 | 0 | 83 | 1.6 |
| T5 | 5.8 | 0 | 94 | 1.7 |

Trial 2

The injection concentration of the mercury absorbent material was varied and lime was injected to control $SO_3$ at a targeted equivalent rate of 100 lbs/hr.

| | Mercury Sorbent Injection Concentration (lb/MMacf) | Lime Injection Rate (lb/hr) | % Mercury Removal | SO$_3$ Concentration in Effluent (PPMV) |
|---|---|---|---|---|
| T6 | 1.1 | 105 | 21 | 0.46 |
| T7 | 2.4 | 108 | 42 | 0.41 |
| T8 | 3.5 | 97 | 74 | 0.38 |
| T9 | 5.5 | 97 | 89 | 0.42 |
| T10 | 5.8 | 101 | 97 | 0.35 |

Trial 3

The injection rate of lime was varied and the injection concentration of the mercury absorbent material was targeted to 3.5 lb/MMacf for trial examples T11 to T15 and targeted to 4.0 lb/MMacf for trial examples T16 to T20.

| | Mercury Sorbent Injection Concentration (lb/MMacf) | Lime Injection Rate (lb/hr) | % Mercury Removal | SO$_3$ Concentration in Effluent (PPMV) |
|---|---|---|---|---|
| T11 | 3.6 | 104 | 77 | 0.47 |
| T12 | 3.4 | 158 | 75 | 0.40 |
| T13 | 3.7 | 210 | 79 | 0.31 |
| T14 | 3.5 | 245 | 80 | 0.25 |
| T15 | 3.6 | 298 | 78 | 0.24 |
| T16 | 4.1 | 98 | 82 | 0.44 |
| T17 | 3.8 | 148 | 84 | 0.37 |
| T18 | 4.0 | 198 | 84 | 0.26 |
| T19 | 3.9 | 254 | 85 | 0.21 |
| T20 | 4.1 | 302 | 86 | 0.20 |

The foregoing description is given for clearness of understanding only, and no unneecessary limitations should be understood therefrom, as modifications within the scope of the invention may be apparent to those having ordinary skill in the art.

What is claimed:

1. A method of collecting mercury from a flue gas comprising:
    injecting a mercury sorbent material into a flue duct carrying the flue gas to provide an injection concentration, the mercury sorbent material made by exothermically shearing a smectite clay containing an exchangeable cation with a copper salt and a sulfur source; and providing an enthalpically driven ion pairing of the clay exchangeable cation with the copper salt; and wherein the mercury sorbent material is substantially free of a diffraction peak at 2.73±0.01 Å;
    reacting the mercury sorbent material with mercury in the flue gas to form a mercury-sorbed material and thereby reducing the concentration of mercury in the flue gas;
    injecting lime into the flue duct at a location such that the mercury sorbent material and the lime mix in the flue duct;
    reacting the lime with SO$_2$, SO$_3$, and/or HCl in the flue gas to form a reaction product selected from the group consisting of a calcium sulfate, a calcium chloride, and a mixture thereof; and
    collecting a byproduct mixture that comprises the mercury-sorbed material, and any unreacted mercury sorbent material.

2. The method of claim 1, wherein the byproduct mixture includes unreacted lime.

3. The method of claim 1, wherein the byproduct mixture includes fly ash.

4. The method of claim 1, wherein the injection concentration of the mercury sorbent material is in a range of about 1 to about 20 lbs/MMacf of flue gas.

5. The method of claim 1, wherein an injection rate of lime is less than about 10,000 lbs/hr.

6. The method of claim 1, wherein the mercury sorbent material and the lime are synergistic.

7. A method of collecting mercury from a flue gas comprising:
    admixing a mercury sorbent material and lime to form a flue gas scrubbing composition, the mercury sorbent material made by exothermically shearing a smectite clay containing an exchangeable cation with a copper salt and a sulfur source; and providing an enthalpically driven ion pairing of the clay exchangeable cation with the copper salt; and wherein the mercury sorbent material is substantially free of a diffraction peak at 2.73±0.01 Å; then
    injecting the flue gas scrubbing composition into a flue duct containing a flue gas, wherein the flue gas scrubbing composition reacts with mercury and SO$_2$, SO$_3$, and/or HCl in the flue gas, forming a mercury-sorbed material and thereby reducing the concentration of mercury in the flue gas; and
    collecting a mixture that includes the mercury-sorbed material and any unreacted flue gas scrubbing composition.

8. The method of claim 7, wherein a flue gas scrubbing composition injection rate comprises a lime injection rate of less than about 10,000 lbs/hr and a mercury sorbent material injection concentration in a range of about 1 to about 20 lbs/MMacf.

9. The method of claim 7, wherein the mercury sorbent material and the lime are admixed in a mass ratio sufficient to provide a predetermined lime injection rate and mercury sorbent material injection concentration based on a predetermined flue gas flow rate.

10. The method of claim 7 further comprising determining the flue gas flow rate;
    determining the mercury and sulfur concentrations in the flue gas;
    determining a mercury sorbent material injection concentration; and
    determining a lime injection rate;
    wherein the mercury sorbent material and lime are admixed in a ratio sufficient to provide the lime injection rate, the mercury sorbent material injection concentration, and at least an 80% mercury removal.

11. The method of claim 7, wherein the mercury sorbent material and the lime are synergistic.

12. A method of entombing mercury comprising:
    mixing a byproduct mixture that comprises the mercury-sorbed material formed by the method of claim 1 with water to form a freshly mixed concrete, the mercury-sorbed material made by reacting a mercury sorbent material with a mercury containing flue gas; and
    casting the freshly mixed concrete into a form.

13. The method of claim 12 further comprising mixing the byproduct mixture with Portland Cement.

14. The method of claim 12, wherein the byproduct mixture comprises at least one material selected from the group consisting of a mercury sorbent material, a lime, a calcium sulfate, a fly ash, and a mixture thereof.

15. The method of claim 14, wherein the byproduct mixture comprises the mercury-sorbed material, the mercury sorbent material, a lime, a calcium sulfate, and a fly ash.

16. A flue gas scrubbing composition consisting essentially of:
- a mercury sorbent material that is substantially free of a clay/covellite composite as determined by powder X-ray diffraction, the powder X-ray diffraction pattern being substantially free of a peak at 2.73 ±0.01 Å, and made by shearing a mixture of a silicate, a copper ion source, a sulfide ion source, and water; and
- lime that comprises calcium oxide and/or calcium hydroxide.

17. The flue gas scrubbing composition of claim 16, wherein a mercury absorptivity of the flue gas scrubbing composition is greater than 70% of a mercury absorptivity of the mercury sorbent material in the absence of the lime.

18. The flue gas scrubbing composition of claim 16 further comprising a ratio of the mercury sorbent material and lime sufficient to provide a predetermined lime injection rate and mercury sorbent material injection concentration based on a predetermined flue gas flow rate.

* * * * *